(12) United States Patent
Willems

(10) Patent No.: US 9,120,361 B2
(45) Date of Patent: Sep. 1, 2015

(54) WHEEL SUSPENSION WITH ROTATION DAMPER

(75) Inventor: Marco Willems, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/123,010

(22) PCT Filed: May 23, 2012

(86) PCT No.: PCT/EP2012/002188
§ 371 (c)(1),
(2), (4) Date: Mar. 7, 2014

(87) PCT Pub. No.: WO2012/163492
PCT Pub. Date: Dec. 6, 2012

(65) Prior Publication Data
US 2014/0300072 A1    Oct. 9, 2014

(30) Foreign Application Priority Data
May 28, 2011    (DE) .......................... 10 2011 102 743

(51) Int. Cl.
*B60G 7/00* (2006.01)
*B60G 7/02* (2006.01)
*B60G 13/00* (2006.01)
(Continued)

(52) U.S. Cl.
CPC *B60G 7/001* (2013.01); *B60G 7/02* (2013.01); *B60G 13/003* (2013.01); *B60G 17/06* (2013.01); *F16F 15/03* (2013.01); *B60G 2200/132* (2013.01); *B60G 2202/12* (2013.01); *B60G 2202/22* (2013.01); *B60G 2204/124* (2013.01); *B60G 2204/128* (2013.01)

(58) Field of Classification Search
USPC ........ 280/124.13, 124.131, 124.134, 124.164
IPC .................. B60G 7/02,2200/132, 7/001, 17/06,
B60G 13/003, 2202/12, 2202/22, 2204/124,
B60G 2204/128; F16F 15/03
See application file for complete search history.

(56) References Cited

U.S. PATENT DOCUMENTS 5,005,859 A * 4/1991 Satoh et al. .............. 280/124.13
5,074,581 A   12/1991 Matsuoka
(Continued)

FOREIGN PATENT DOCUMENTS

DE    40 15 777    11/1990
DE    199 19 279   11/2000
(Continued)

OTHER PUBLICATIONS

International Search Report issued by the European Patent Office in International Application PCT/EP2012/002188 on Sep. 25, 2012.

*Primary Examiner* — Faye M Fleming
(74) *Attorney, Agent, or Firm* — Henry M. Feiereisen LLC

(57) ABSTRACT

A motor vehicle has a plurality of vehicle wheels that are or can be mounted on the vehicle body by means of wheel suspensions. A wheel has at least one suspension arm that connects a vehicle wheel to a vehicle body and is pivotable about an axis, and at least one rotation damper having at least one damper element for damping the relative movement between a first mass arranged on the wheel suspension and a second mass arranged on the vehicle body. The rotation damper is integrated directly into the mounting of the suspension arm, wherein pivoting movements of the suspension arm induced by the mass movement can be transferred to a rotatable damper part of the damper element which is motion-coupled to the connecting element.

16 Claims, 2 Drawing Sheets

(51) Int. Cl.
  *F16F 15/03* (2006.01)
  *B60G 17/06* (2006.01)

(56) References Cited

U.S. PATENT DOCUMENTS

| | | | |
|---|---|---|---|
| 8,573,617 B2 * | 11/2013 | Meitinger et al. | ....... 280/124.13 |
| 2012/0280465 A1 | 11/2012 | Meitinger et al. | |
| 2012/0292874 A1 | 11/2012 | Davy et al. | |
| 2013/0049508 A1 | 2/2013 | Willems | |

FOREIGN PATENT DOCUMENTS

| | | |
|---|---|---|
| DE | 602 26 122 | 5/2009 |
| DE | 102009048818 | 4/2011 |
| DE | 102009051468 | 5/2011 |
| EP | 1 043 516 | 10/2000 |
| EP | 1 935 679 | 6/2008 |
| JP | 4-81311 | 3/1992 |
| JP | 2000-120749 | 4/2000 |
| WO | WO 2009/107832 | 9/2009 |
| WO | WO 2011/072967 | 6/2011 |

* cited by examiner

WHEEL SUSPENSION WITH ROTATION DAMPER

CROSS-REFERENCES TO RELATED APPLICATIONS

This application is the U.S. National Stage of International Application No. PCT/EP2012/002188, filed May 23, 2012, which designated the United States and has been published as International Publication No. WO 2012/163492 and which claims the priority of German Patent Application, Serial No. 10 2011 102 743.6, filed May 28, 2011, pursuant to 35 U.S.C. 119(a)-(d).

BACKGROUND OF THE INVENTION

The invention relates to a motor vehicle having a plurality of vehicle wheels that can be attached or are attached on the side of the vehicle body via wheel suspensions, wherein a wheel suspension has at least one suspension arm that connects a vehicle wheel to the vehicle body and is pivotally mounted for pivoting about an axis, and at least one rotation damper having at least one damper element for damping the relative movement between a first mass arranged on a wheel suspension side and a second mass arranged on a vehicle body side.

Many areas of technology require attenuation of a relative movement between two components of a vibratory mechanical system. One example is the vibration damping on a motor vehicle body in the region of the wheel suspension. For example, DE 602 26 122 T2 discloses arranging a rotation damper on the vehicle body side and connecting the rotation damper to a wheel suspension of a motor vehicle.

Rotation dampers are typically connected to a suspension of a motor vehicle via linkages having push rods and the like. Thus, additional components are required for connecting the rotation damper, which is disadvantageous especially in view of the known limited installation space in the region of the wheel suspension and in view of the weight and cost of the wheel suspension. Furthermore, corresponding linkages show a natural oscillation behavior resulting from their support on the side of the vehicle body and the rotation damper. This may cause noticeable acoustic vibrations which cannot be adequately attenuated with corresponding vibration dampers.

Eccentric connections of corresponding rotation dampers typically allow only relatively small angular ranges usable for movement of a rotation damper. When larger angular ranges are exceeded, discontinuous transformations between mass movement and damper rotation may result. Correspondingly long rods must be used to realize a large spring excursions, which is problematic, as mentioned above, in view of the usually limited installation space in the region of the wheel suspension.

SUMMARY OF THE INVENTION

The invention addresses the problem of providing a motor vehicle with an improved connection of a rotation damper to a wheel suspension, in particular considering the limited installation space situation in the suspension.

The problem is solved by a motor vehicle of the afore-described type, which is characterized in that the rotation damper is integrated directly into the support of the suspension arm, whereby pivoting movements of the suspension arm brought about by the mass movement can be transferred to a rotatable damper part of the damper element that is motion-coupled with the suspension arm.

The principle of the present invention provides a novel arrangement and connection, respectively, of a rotation damper to a wheel suspension of a motor vehicle, wherein the rotation damper is directly integrated in the support of a suspension arm, in particular a transverse suspension arm, of the wheel suspension. Pivoting movements of the suspension arm occurring during operation of the motor vehicle are here transferred to a rotatable damper part of the damper element that is motion-coupled to the suspension arm, i.e. the rotation damper is driven by corresponding pivoting movements of the suspension arm. Accordingly, the problem of the vibrations induced by the linkage is eliminated with the principle of the invention.

The components for the articulation of the rotation damper which take up space, i.e. the associated rotatable damper part, in particular the linkages mentioned above, are eliminated through direct integration of the rotation damper in the suspension arm, thus producing a particularly space-saving, compact design of a wheel suspension.

The suspension arm may be constructed of single part or of multiple parts, i.e., the suspension arm may be formed as a single component having one, optionally several struts extending between the vehicle wheel and the vehicle body or may be formed of plurality of corresponding individual struts.

The inventive principle is applicable for wheel suspensions of steerable axes, typically the front axles, as well as for wheel suspensions of unsteered axles of a motor vehicle, typically the rear axles. It is preferred, but not absolutely necessary, to integrate corresponding rotation dampers in all suspension arms of the vehicle-side wheel suspensions.

The rotation damper is advantageously arranged inside a hollow-cylindrical bearing seat of the suspension arm disposed on the vehicle-body-side, wherein the bearing seat is motion-coupled to the rotary damping part. The bearing seat is also designated as bearing eye and forms the interface between the wheel suspension and the vehicle body. The bearing seat has typically a cylindrical cavity extending in the vehicle's longitudinal axis, in which the rotation damper is received or arranged. The bearing seat is rotationally fixed, i.e. preferably constructed integral with the suspension arm, so that the respective pivoting movements of the suspension arm cause rotational movements of the fixedly mounted bearing seat about its bearing axis. The rotational movements of the bearing seat are transmitted directly or indirectly to the rotatable damper part by way of its motion coupling to the rotatable damper part.

The motion coupling between the bearing seat and rotatable damper part may be formed of at least one connecting element originating at the bearing seat and being non-rotatably connected to the rotatable damper part. Thus, a pivoting movement of the suspension arm induced by the relative mass movement, i.e., as described above, a corresponding rotational movement of the bearing seat, is transmitted directly to the rotatable damper part by way of the connecting element which has, for example, the shape of a connecting ring or an annular collar that is connected in rotationally fixed manner to the rotatable damper part. It will be understood that the connecting element is connected to the bearing seat in a rotationally fixed manner. Altogether, this is a relatively simple structural design.

Alternatively, the motion coupling may also be formed by at least one connecting element originating from the bearing seat and motion-coupled with a first gear element associated with a gear, wherein a rotational movement can be imparted on the first gear element via the connecting element and at least one second gear element which is coupled, either directly or indirectly, with a gear ratio to the first gear element is motion-coupled with the rotatable damper element such that the rotatable damper part performs a rotational movement. In this embodiment, the rotational movement of the bearing seat is thus transferred indirectly to the rotatable damper part, since a gear is connected between the bearing seat and the rotatable damper part. The interposition of a gear allows the movement of the connecting element of the bearing seat to be stepped up, so that relatively small movements and displacements, respectively, of the connecting element with respect to the bearing seat produce a high number of revolutions or a high rotational speed of the rotatable damper part of the damper element. Accordingly, the damping effect of the damper element can be increased. For example, a connecting ring and annular collar connected to the bearing seat in a rotationally fixed manner can be used as the connecting element.

The gear can be designed, for example, in the form of a planetary gear, a strain wave gear, a cycloid gear or a spur gear. Other types of gears are also feasible.

Advantageously, at least one spring damper element or a vibration damper, respectively, in particular formed from an elastomeric material, may be disposed between the bearing seat and the rotation damper. The spring damper element may be formed, for example, as a hollow cylindrical elastomeric track, and generally serves as additional support of the rotation damper in the bearing seat and is, for example, connected to both the inner diameter of the bearing seat and the outer diameter of the damper element by vulcanizing, gluing, etc. The spring damper element is used to attenuate the vibrations generated during operation of the motor vehicle and/or of the rotation damper, wherein in particular high-frequency, low-amplitude excitations are attenuated. The spectrum to be damped can be specifically matched to the vibrations to be attenuated by a suitable choice of the material forming the spring damper element.

The damper element may include a hollow cylindrical housing in which the rotatable damper part and a stationary damper part are incorporated or integrated, wherein the rotatable damper part is rotatably mounted so as to generate a damping force relative to the stationary damper part. The housing is releasably or non-releasably connected to the vehicle body via at least one housing section having suitable mounting portions. This may include, for example, a non-rotatable connection of the housing to the vehicle body or to an associated subframe and the like.

The stationary damper part and the rotatable damper part may each be formed as a hollow-cylindrical body, wherein either the fixed damper part is received inside the rotatable damper part or the rotatable damper part damper part is received inside the stationary damper part. The arrangement in any case such that the rotatable damper part that is directly or indirectly motion-coupled to the connecting element of the bearing seat is able to rotate relative to the damper part fixed stationary damper part. The stationary or the rotatable rotation damper part can accordingly be formed as part of or be integrated in the housing of the damper element such that the housing is rotatably mounted in the event that damper part rotates a portion of the housing of the damper element. Of course, in this case, the stationary damper part of the damping element is connected to the vehicle body in a rotationally fixed manner.

The rotation damper is preferably designed as an electric rotation damper having at least one electrical damper element. Accordingly, the damper element can convert mechanical energy into electrical energy. In this embodiment, the rotation damper includes a generator driven by the mass movement with a fixed stator (stationary damper part) and a rotor rotatable relative thereto (rotatable damper part) and advantageously a gear coupled to the generator. The functional operation of the electric damper is then based on the coupling between the generator and the gear, wherein the drive element of the gear transmits to the rotor a rotational movement introduced via the connecting element of the bearing seat that is directly coupled to the drive element of the gear. The rotational movement introduced into the rotor due causes the damping via the generator and the recovery or conversion of the mechanical damping energy originally caused by the mass movement into electrical current generated by the generator.

BRIEF DESCRIPTION OF THE DRAWING

Further advantages, features and details of the invention will become apparent from the exemplary embodiments described below and with reference to the drawings which show in.

DETAILED DESCRIPTION OF PREFERRED EMBODIMENTS

Figure 1:
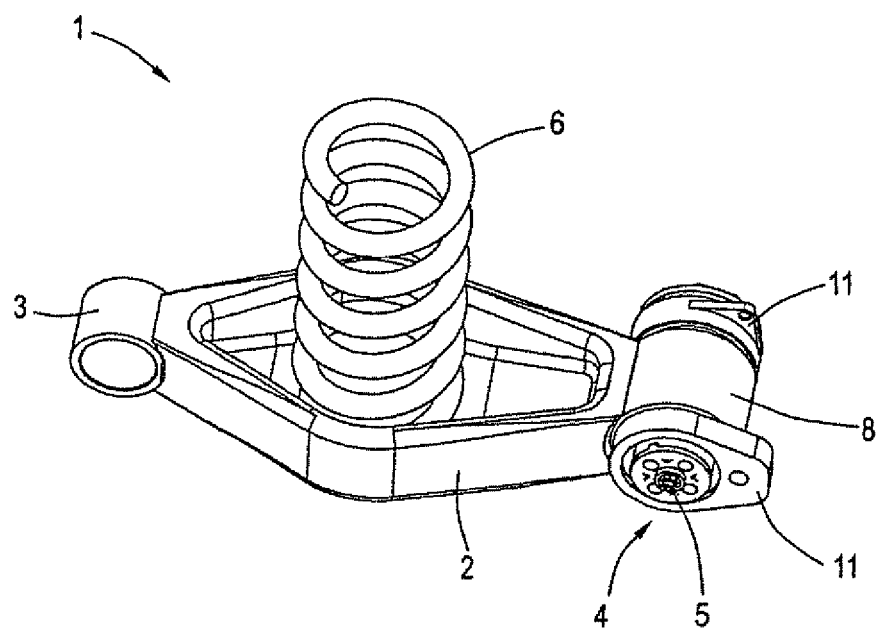
FIG. 1 a schematic diagram of a wheel suspension of a motor vehicle according to an exemplary embodiment of the invention.
Figure 2:
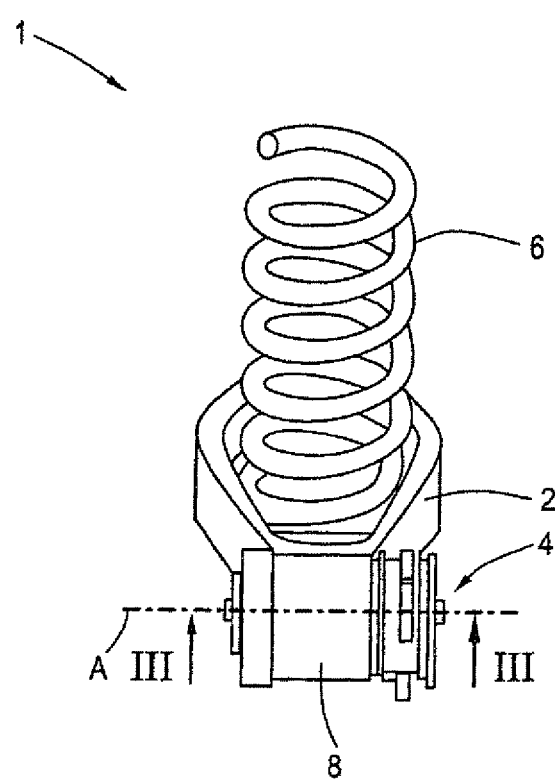
FIG. 2 an alternative view of the wheel suspension shown in FIG. 1.

FIG. 1 shows a schematic diagram of a wheel suspension 1 of a motor vehicle (not shown) according to an exemplary embodiment of the invention. FIG. 2 shows an alternative view of the suspension 1 shown in FIG. 1. The wheel suspension 1 is used in a conventional manner for connecting a vehicle wheel (not shown) to a vehicle body (not shown). Thus, the motor vehicle generally includes four corresponding wheel suspensions 1 associated with the respective vehicle wheels.

The wheel suspension 1 includes a pivotally mounted suspension arm 2 which pivots about a pivot axis. The suspension arm 2 is designed as a transverse suspension arm, i.e. it runs essentially transverse to the vehicle's longitudinal axis. A bearing seat 3 for connection to a vehicle wheel is provided on the suspension arm 2 on the left side, i.e. a side facing away from the vehicle body and facing a vehicle wheel, respectively.

A rotation damper 1 having a damper element 5 is integrated in the wheel suspension 4, wherein the damper element 5 serves to dampen the relative movement between a first mass arranged on the wheel suspension side in the form of the respective vehicle wheel and a second mass in the form of the vehicle body. In the embodiment shown in FIG. 1, a spring assembly 6 is additionally arranged on the suspension arm 2, which however need not be a necessary component of the wheel suspension 1.

As can be seen, the rotation damper 4 is integrated directly into a hollow cylindrical bearing seat 8 or bearing eye of the suspension arm 2 on the vehicle body side. The pivoting movements of the suspension arm 2 excited by the mass movement are then transferred to a motion-coupled rotatable damper part 7 (see in particular FIG. 3) of the damper element 5. The bearing seat 8 is accordingly motion-coupled with the rotatable damper part 7, i.e. rotational movements of the bearing seat 8 induced during pivoting of the suspension arm 2 about its bearing seat axis A are transmitted to the rotatable damper part 7, thereby creating a damping effect of the damper element 5.

The shape of the rotation damper 4 and of the damper element 5, respectively, is modeled after the shape of the bearing seat 8 so that the rotation damper 4 may be easily disposed inside the bearing seat 8. Accordingly, the damper element 5 has a hollow cylindrical housing 9 in which the rotatable damper part 7 and a stationary damper part 10 are received or integrated. The rotatable damper part 7 is hereby rotatably supported relative to the stationary damper part 10, producing a damping force. However, the housing 9 itself is not rotatably mounted, but is instead connected to the vehicle body with connecting elements 11 in a rotationally fixed manner.

Figure 3:
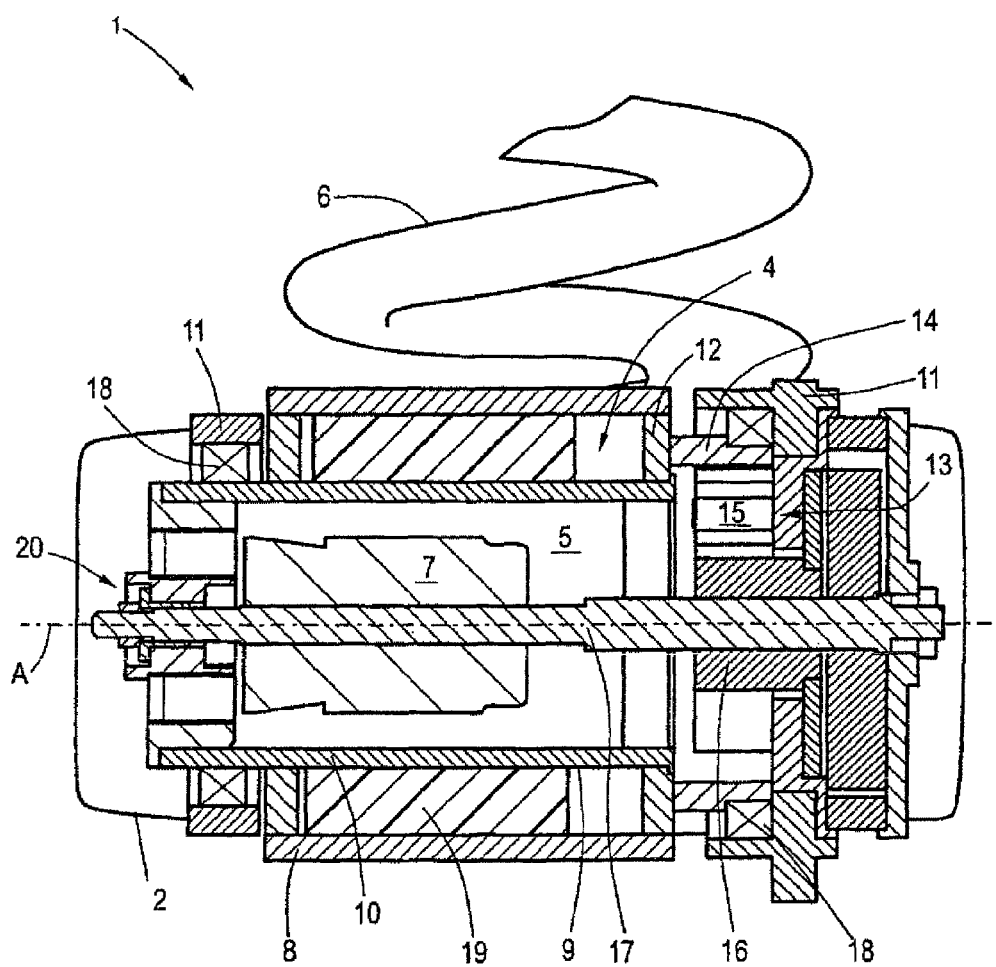
FIG. 3 a sectional view taken along the line III-III in FIG. 2.

FIG. 3 shows a sectional view taken along the line III-III in FIG. 2. The arrangement of the rotation damper 4 or the damper element 5, respectively, in the vehicle-body-side bearing seat 8 is visible. As is also evident, the housing 9 of the damper element 5 is received directly inside the bearing seat 8.

The rotatable damper part 7 is here indirectly connected or motion-coupled with a connecting means 12 in the form of an annular collar that is connected with the bearing seat 8 in a rotationally fixed manner. The articulation of the rotatable damper part 7 is hence not direct, because a gear 13 is connected between the connection means 12 and the rotatable damper part 7. The gear 13 is in this embodiment formed as a planetary gear and is used for stepping up corresponding rotational movements of the bearing seat 8, so that these can be transmitted with higher rotation speeds of the rotatable damper part 7, which greatly improves the damping effect of the damper element 5.

The connecting means 12 of the bearing seat 8 is axially connected to a ring gear 14 of the gear 13, i.e. is connected thereto in a rotationally fixedly manner. The ring gear 14 meshes in a known manner with a plurality of planetary wheels 15, which in turn mesh with an installed sun gear 16. The sun gear 16 is non-rotatably connected to an axial pin 17 which extends through the bearing seat 8 in the axial direction along the bearing seat axis A. As can be seen, the rotatable damper part 7 is disposed on the axial pin 17. The arrangement is in fixed rotational engagement so that rotational movements and/or torques of the axial pin 17 are transmitted commensurately to the rotatable damper part 7. The stationary damper part 10 is here integrated into the housing 9 of the damper element 5.

FIG. 3 also shows the rotationally fixed support of the housing 9 of the damper element 5 via suitable bearing elements 18. Also visible is a ring-shaped spring damper element 19 formed of an elastomeric material, which is disposed between the bearing seat 8 and the housing 9 of the damper element 5 and connected both to the bearing seat 8 and to the housing 9 by vulcanization. The spring damper element 19 generally serves as additional support for the rotation damper 3 inside the bearing seat 8. The spring damper element 19 also enables damping of vibrations occurring during the operation of the motor vehicle and/or of the rotation damper 1, wherein in particular high-frequency low-amplitude excitations are attenuated. The spring damper element 19 can also be referred to as so-called elastomeric track.

Advantageously, the rotation damper 4 may be formed as an electric rotation damper, i.e. the damper element 5 is constructed as an electrical machine or generator, respectively, wherein the rotatable damper part 7 is designed as a rotor and the fixed damper part 10 is designed as a stator.

Accordingly, the mechanical energy produced during spring compression of the wheel suspension 1 equipped with the rotation damper 4 relative to the suspension arm 2 is recovered and/or converted into electrical energy by relative movement of the rotatable damper part 7 forming the rotor relative to the stationary damper part 10 forming the stator, wherein the electrical energy can then be supplied, for example via suitable stator-side connection means 20, to an onboard network of the motor vehicle. The rotatable damper part 7, i.e. the rotor, has for this purpose for example respective permanent magnets, whereas the stationary damper part 10, i.e. the stator, has unillustrated windings. The connecting means 20 may be formed as a commutator housing or as a part of a commutator housing supporting the axial pin 17 on an end wall of the housing.

The recovery and conversion of the mechanical energy is based on the principle of magnetic induction, i.e. a moment opposing the rotation of the rotatable damper part 7 is generated during interaction with an exciting magnetic field through magnetic induction, which represents the damping force of the electric damper element 5.

Likewise, an electric current could also be generated with the rotatable damper part 7 forming the rotor, which would then have corresponding windings instead of the stationary damper part 10. The damping properties of the damper element 5 operating as a generator can be set by applying a specific current to the generator.

The principle of the invention allows a particularly compact connection and/or integration of a rotation damper 4 to a wheel suspension 1, since the rotation damper 4 is integrated directly into a corresponding suspension arm 2 of a vehicle axle. Common damper elements, such as telescopic shock absorbers and the like, are not necessary. The overall very compact design of the wheel suspension 1 according to the invention has, for example, a positive effect on the load-area width and the pedestrian protection, respectively, of the motor vehicle according to the invention.

The invention claimed is:

1. A motor vehicle comprising:
   a vehicle body,
   a wheel suspension configured for attachment of a vehicle wheel on a side of the vehicle body, the wheel suspension comprising a suspension arm that connects the vehicle wheel to the vehicle body and is pivotally supported in a suspension arm seat for pivoting about an axis, and
   a rotation damper constructed as an electrical rotation damper having at least one electrical damper element for damping relative movement between a first mass arranged on a wheel suspension side and a second mass arranged on a vehicle body side,
   wherein the rotation damper is integrated directly in the suspension arm seat, and wherein pivoting movements of the suspension arm induced by the relative mass movement are transmitted to a rotatable damper part of the at least one damper element that is motion-coupled to the suspension arm.

2. The motor vehicle of claim 1, wherein the rotation damper is arranged inside a hollow-cylindrical bearing seat of the suspension arm on the vehicle body side, wherein the bearing seat is motion-coupled with the rotatable damper part.

3. The motor vehicle of claim 2, further comprising a connecting element that originates from the bearing seat and is connected with the rotatable damper part in a rotationally fixed manner, wherein the connecting element motion-couples the rotatable damper part and the suspension arm.

4. The motor vehicle of claim 1, wherein the damper element comprises a hollow cylindrical housing, in which the rotatable damper part and a stationary damper part are received or integrated, wherein the rotatable damper part is rotatably mounted relative to the stationary damper part to produce a damping force.

5. The motor vehicle of claim 4, wherein the housing is connected to the vehicle body in a rotatably fixed manner.

6. The motor vehicle of claim 4, wherein the rotatable damper part and the stationary damper part are each formed as a hollow-cylindrical body, wherein either the rotatable damper part is received inside the stationary damper part, or the stationary damper part is received inside the rotatable damper part.

7. A motor vehicle comprising:
a vehicle body,
a wheel suspension configured for attachment of a vehicle wheel on a side of the vehicle body, the wheel suspension comprising a suspension arm that connects the vehicle wheel to the vehicle body and is pivotally supported in a suspension arm seat for pivoting about an axis,
a rotation damper having a damper element for damping relative movement between a first mass arranged on a wheel suspension side and a second mass arranged on a vehicle body side,
wherein the rotation damper is integrated directly in the suspension arm seat, and wherein pivoting movements of the suspension arm induced by the relative mass movement are transmitted to a rotatable damper part of the damper element that is motion-coupled to the suspension arm,
wherein the rotation damper is arranged inside a hollow-cylindrical bearing seat of the suspension arm on the vehicle body side, wherein the bearing seat is motion-coupled with the rotatable damper part,
a connecting element that originates from the bearing seat and motion-couples the rotatable damper part and the suspension arm,
and a gear having a first gear element configured to be rotated by the connecting element, and a second gear element coupled directly or indirectly with the first gear element with a gear ratio and motion-coupled to the rotatable damper part, thereby causing the rotatable damper part to rotate.

8. The motor vehicle of claim 7, wherein the gear is formed as a planetary gear, a strain wave gear, a cycloid gear or a spur gear.

9. The motor vehicle of claim 7, wherein the damper element comprises a hollow cylindrical housing, in which the rotatable damper part and a stationary damper part are received or integrated, wherein the rotatable damper part is rotatably mounted relative to the stationary damper part to produce a damping force.

10. The motor vehicle of claim 9, wherein the housing is connected to the vehicle body in a rotatably fixed manner.

11. The motor vehicle of claim 9, wherein the rotatable damper part and the stationary damper part are each formed as a hollow-cylindrical body, wherein either the rotatable damper part is received inside the stationary damper part, or the stationary damper part is received inside the rotatable damper part.

12. A motor vehicle comprising:
a vehicle body,
a wheel suspension configured for attachment of a vehicle wheel on a side of the vehicle body, the wheel suspension comprising a suspension arm that connects the vehicle wheel to the vehicle body and is pivotally supported in a suspension arm seat for pivoting about an axis,
a rotation damper having a damper element for damping relative movement between a first mass arranged on a wheel suspension side and a second mass arranged on a vehicle body side,
wherein the rotation damper is integrated directly in the suspension arm seat, and wherein pivoting movements of the suspension arm induced by the relative mass movement are transmitted to a rotatable damper part of the damper element that is motion-coupled to the suspension arm,
wherein the rotation damper is arranged inside a hollow-cylindrical bearing seat of the suspension arm on the vehicle body side, wherein the bearing seat is motion-coupled with the rotatable damper part, and
a spring damper element arranged between the bearing seat and the rotation damper.

13. The motor vehicle of claim 12, wherein spring damper element is made from an elastomeric material.

14. The motor vehicle of claim 12, wherein the damper element comprises a hollow cylindrical housing, in which the rotatable damper part and a stationary damper part are received or integrated, wherein the rotatable damper part is rotatably mounted relative to the stationary damper part to produce a damping force.

15. The motor vehicle of claim 14, wherein the housing is connected to the vehicle body in a rotatably fixed manner.

16. The motor vehicle of claim 14, wherein the rotatable damper part and the stationary damper part are each formed as a hollow-cylindrical body, wherein either the rotatable damper part is received inside the stationary damper part, or the stationary damper part is received inside the rotatable damper part.

* * * * *